US008798149B2

(12) United States Patent
Wu et al.

(10) Patent No.: US 8,798,149 B2
(45) Date of Patent: Aug. 5, 2014

(54) ENHANCEMENT LAYER RESIDUAL PREDICTION FOR BIT DEPTH SCALABILITY USING HIERARCHICAL LUTS

(75) Inventors: Yu Wen Wu, Beijing (CN); Yong Ying Gao, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 1220 days.

(21) Appl. No.: 12/287,784

(22) Filed: Oct. 14, 2008

(65) Prior Publication Data

US 2009/0110073 A1 Apr. 30, 2009

(30) Foreign Application Priority Data

Oct. 15, 2007 (EP) ..................................... 07301467

(51) Int. Cl.
H04N 7/12 (2006.01)
H04N 7/50 (2006.01)
H04N 7/46 (2006.01)

(52) U.S. Cl.
CPC . *H04N 7/50* (2013.01); *H04N 7/462* (2013.01)
USPC ............ 375/240.15; 375/240.25; 375/240.26; 382/232; 382/166

(58) Field of Classification Search
CPC ............ H04N 7/50; H04N 7/30; H04N 7/462
USPC ....................................... 375/240.01, 240.28
IPC ....................................................... H04N 7/12
See application file for complete search history.

(56) References Cited

U.S. PATENT DOCUMENTS 7,483,486 B2 * 1/2009 Mantiuk et al. .......... 375/240.03
7,876,833 B2 * 1/2011 Segall et al. ............. 375/240.24
8,085,852 B2 * 12/2011 Liu et al. .................. 375/240.25
(Continued)

FOREIGN PATENT DOCUMENTS

JP 2010531584 9/2010
WO WO2004114671 12/2004

OTHER PUBLICATIONS

Yuwen Wu; Yongying Gao; Ying Chen; , "Bit Depth Scalable Coding," Multimedia and Expo, 2007 IEEE International Conference on , vol., no., pp. 1139-1142, Jul. 2-5, 2007; doi: 10.1109/ICME.2007.4284856.*

(Continued)

*Primary Examiner* — Jessica Roberts
(74) *Attorney, Agent, or Firm* — Myers Wolin LLC

(57) ABSTRACT

A scalable video bitstream may have an H.264/AVC compatible base layer and a scalable enhancement layer, where scalability refers to color bit-depth. According to the invention, BL information is bit-depth upsampled using separate look-up tables for inverse tone mapping on two or more hierarchy levels, such as picture level, slice level or MB level. The look-up tables are differentially encoded and included in header information. Bit-depth upsampling is a process that increases the number of values that each pixel can have, corresponding to the pixels color intensity. The upsampled base layer data are used to predict the collocated enhancement layer, based on said look-up tables. The upsampling is done at the encoder side and in the same manner at the decoder side, wherein the upsampling may refer to temporal, spatial and bit depth characteristics. Thus, the bit-depth upsampling is compatible with texture upsampling.

17 Claims, 4 Drawing Sheets

(56) References Cited

U.S. PATENT DOCUMENTS

| | | | |
|---|---|---|---|
| 8,411,753 B2* | 4/2013 | Cha et al. | 375/240.18 |
| 2005/0259729 A1* | 11/2005 | Sun | 375/240.1 |
| 2008/0068472 A1* | 3/2008 | Zhou | 348/236 |
| 2010/0020866 A1* | 1/2010 | Marpe et al. | 375/240.02 |
| 2010/0135393 A1 | 6/2010 | Gao et al. | |
| 2010/0158110 A1* | 6/2010 | Pandit et al. | 375/240.12 |

OTHER PUBLICATIONS

Winken, M.; Marpe, D.; Schwarz, H.; Wiegand, T.; , "Bit-Depth Scalable Video Coding," Image Processing, 2007. ICIP 2007. IEEE International Conference on , vol. 1, no., pp. I-5-I-8, Sep. 16, 2007-Oct. 19, 2007; doi: 10.1109/ICIP.2007.4378877.*

Martin Winken et al.: "Bit-Depth Scalable Video Coding" Image Processing, 2007 ICIP 2007, IEEE International Conference on, IEEE, PI, Sep. 1, 2007, pp. 1-5, XP031157664.

Winken M. et al.: "SVC bit depth scalability" Video Standards and Drafts, XX, XX, No. JVT-V078, Jan. 14, 2007, XP030006886.

Yuwen Wu et al.: "Bit Depth Scalable Coding" Multimedia and Expo, 2007 IEEE International Conference on, IEEE, PI, Jul. 1, 2007, pp. 1139-1142, XP031123831.

International Search report dated May 23, 2008.

Winken, M. et al., "SVC Bit Depth Scalability", Joint Video Team (JVT) of ISO/IEC MPEG & ITU-T VCEG (ISO/IEC JTC1/SC29/WG11 and ITU-T SG16 Q.6), Document No. JVT-V078, 22nd Meeting: Marrakech, Morocco, Jan. 13-19, 2007, pp. 1-15.

Segall, A. et al., "System for Bit-Depth Scalable Coding", Joint Video Team (JVT) of ISO/IEC MPEG & ITU-T VCEG (ISO/IEC JTC1/SC29/WG11 and ITU-T SG16 Q.6), Document No. JVT-W113, 23rd Meeting: San Jose, California, USA, Apr. 21-27, 2007, pp. 1-8.

Gao, Y. et al., "Bit Depth Scalability", Joint Video Team (JVT) of ISO/IEC MPEG & ITU-T VCEG (ISO/IEC JTC1/SC29/WG11 and ITU-T SG16 Q.6), Document No. JVT-V061, 22nd Meeting: Marrakech, Morocco, Jan. 13-19, 2007, pp. 1-15.

Gao, Y. et al., "CE4:SVC Bit-Depth Scalability Simulation Results", Joint Video Team (JVT) of ISO/IEC MPEG & ITU-T VCEG (ISO/IEC JTC1/SC29/WG11 and ITU-T SG16 Q.6), Document No. JVT-W102, 23rd Meeting: San Jose, California, USA, Apr. 21-27, 2007, pp. 1-11.

* cited by examiner

Fig. 3 (Intra-Decoder)

ENHANCEMENT LAYER RESIDUAL PREDICTION FOR BIT DEPTH SCALABILITY USING HIERARCHICAL LUTS

This application claims the benefit, under 35 U.S.C. §119 of EP Application 07301467.2, filed Oct. 15, 2007.

FIELD OF THE INVENTION

The invention relates to the technical field of digital video coding. It presents a coding solution for color bit depth scalability.

BACKGROUND

In recent years, higher color depth rather than the conventional eight bit color depth is more and more desirable in many fields, such as scientific imaging, digital cinema, high-quality-video-enabled computer games and professional studio and home theatre related applications. Accordingly, the state-of-the-art video coding standard H.264/AVC has already included Fidelity Range Extensions (FRExt), which support up to 14 bits per sample and up to 4:4:4 chroma sampling. The current SVC reference software JSVM does not support high bit depth.

However, none of the existing advanced coding solutions supports bit depth scalability that is compatible with other scalability types. For a scenario with two different decoders, or clients with different requests for the bit depth, e.g. 8 bit and 12 bit for the same raw video, the existing H.264/AVC solution is to encode the 12-bit raw video to generate a first bitstream, and then convert the 12-bit raw video to an 8-bit raw video and encode it to generate a second bitstream. If the video shall be delivered to different clients who request different bit depths, it has to be delivered twice, e.g. the two bitstreams are put in one disk together. This is of low efficiency regarding both the compression ratio and the operational complexity.

The European Patent application EP06291041 discloses a scalable solution to encode the whole 12-bit raw video once to generate one bitstream that contains an H.264/AVC compatible base layer (BL) and a scalable enhancement layer (EL). The overhead of the whole scalable bitstream compared to the above-mentioned first bitstream is small compared to the additional second bitstream. If an H.264/AVC decoder is available at the receiving end, only the BL sub-bitstream is decoded, and the decoded 8-bit video can be viewed on a conventional 8-bit display device; if a bit depth scalable decoder is available at the receiving end, both the BL and the EL sub-bitstreams may be decoded to obtain the 12-bit video, and it can be viewed on a high quality display device that supports color depths of more than eight bit.

SUMMARY OF THE INVENTION

The H.264/AVC scalability extension SVC provides also other types of scalability, e.g. spatial scalability. In spatial scalability the number of pixels in BL and EL are different. Thus, the problem arises how to combine bit depth scalability with other scalability types, and in particular spatial scalability. The present invention provides a solution for this problem.

Claim 1 discloses a method for encoding that allows the combination of bit depth scalability and other scalability types. Claim 6 discloses a corresponding decoding method.

An apparatus that utilizes the method for encoding is disclosed in claim 10, and an apparatus that utilizes the method for decoding is disclosed in claim 11.

According to the invention, a look-up table (LUT) based inverse tone mapping technique is employed in the inter-layer prediction to improve the coding efficiency. The LUT based inverse tone mapping technique is used for those EL picture elements for which the collocated BL picture element is intra coded. Common picture elements are macroblocks (MBs), blocks, slices, pictures or groups of pictures. E.g. for slice level, the LUT is created at the encoder based on the reconstructed BL I-slice and the collocated original EL slice. In particular, the LUT can be inserted into the bitstream in a hierarchical way. E.g. in an AVC conformable bitstream, one LUT is generated based on the whole sequence as a "base" LUT; a lower-level LUT can also be generated based on different frames; furthermore, if needed, a slice-level LUT can also be carried within the bitstream. To reduce the overhead introduced by the LUTs, at each level of the LUT only the differences from its immediate upper level LUT are encoded. The whole solution can be implemented within the structure of SVC, and compatibility to other types of scalability, temporal, spatial and SNR scalability is supported.

In one embodiment, the BL information is upsampled in two logical steps, one being texture upsampling and the other being bit depth upsampling. Texture upsampling is a process that increases the number of pixels, and bit depth upsampling is a process that increases the number of values that each pixel can have. The value corresponds to the (color) intensity of the pixel. The upsampled BL picture element is used to predict the collocated EL picture element. An encoder generates a residual from the EL video data, and the residual may be further encoded (usually entropy coded) and transmitted. The BL information to be upsampled can be of any granularity, e.g. units of single pixels, pixel blocks, MBs, slices, whole images or groups of images. Further, it is possible to perform the two logical upsampling steps in a single step. The BL information is upsampled at the encoder side and in the same manner at the decoder side, wherein the upsampling refers to spatial and bit depth characteristics.

Moreover, the combined spatial and bit depth upsampling can generally be performed for intra coded as well as for inter coded images. However, hierarchical LUTs according to the invention are only defined and used if the collocated BL is intra-coded.

In particular, a method for encoding video data having a base layer and an enhancement layer, wherein pixels of the base layer have less bit depth and lower spatial resolution than pixels of the enhancement layer, comprises the steps of encoding base layer data on a first granularity level, e.g. GOP level, several pictures level or slice level, wherein the base layer data are intra-coded, reconstructing the encoded base layer data, generating for the intra-coded base layer data (used as first prediction version of the enhancement layer data) a first tone mapping table defining an individual mapping between the reconstructed base layer data and the corresponding original enhancement layer data, generating for a fraction of the intra-coded base layer data a different second tone mapping table defining an individual mapping between said fraction of the reconstructed base layer data and the corresponding fraction of the corresponding original enhancement layer data, generating a difference table representing the difference between the first and the second tone mapping table (that is: the deviation of the second versus the first tone mapping table), bit-depth upsampling the base layer data based on said first and second tone mapping tables, wherein the second tone mapping table is used only for said fraction of the base layer data and wherein a second predicted version of the corresponding enhancement layer data is obtained that has higher bit-depth resolution than the first predicted version of the enhancement layer data, generating an enhancement layer residual being the difference between the original enhancement layer data and the corresponding second predicted version of the enhancement layer data, and encoding the enhancement layer residual, the first tone mapping table and said difference table, wherein the encoded first tone mapping table is associated to the encoded base layer or enhancement layer data and wherein the difference table is associated to said fraction of the encoded base layer data or enhancement layer data.

In one embodiment, the reconstructed base layer data are spatially, temporally or SNR upsampled before the bit depth upsampling, wherein first predicted versions of the corresponding enhancement layer data are obtained that have higher spatial, temporal or SNR resolution than the base layer data. Then the first mapping table defines generally a tone mapping between the upsampled reconstructed BL data and the corresponding original EL data, and the second tone mapping table defines a mapping between said fraction of the upsampled reconstructed BL data and the corresponding fraction of the corresponding original EL data. Further, the first predicted version of the EL data to which the bit-depth upsampling refers is in this embodiment different from the BL data, since it is upsampled.

According to one aspect of the invention, a method for decoding video data comprises the steps of extracting from encoded EL data or BL data first and second tone mapping data relating to intra-coded EL data, reconstructing a first tone mapping table from the extracted tone mapping data, reconstructing a second tone mapping table from the extracted tone mapping data- and said reconstructed first tone mapping table, wherein the utilized extracted tone mapping data represent the difference between said first and second tone mapping table, determining a first encoding unit to which the first tone mapping table relates, and a second encoding unit to which the second tone mapping table relates, wherein the second encoding unit is a fraction of said first encoding unit, performing inverse quantization and inverse transformation on received BL data and EL data, wherein inverse quantized and inverse transformed EL data comprise a residual, reconstructing intra-coded BL data, upsampling reconstructed BL data, wherein the value depth per pixel is increased and wherein for pixels in said second encoding unit the second tone mapping table is used and for remaining pixels of the first encoding unit the first tone mapping table is used, and wherein predicted EL data are obtained, and reconstructing from the predicted EL data and the inverse quantized and inverse transformed EL data reconstructed EL video data.

The employed principle can be understood as a general and an exceptional LUT: generally a first LUT is valid for a specified range, e.g. a slice, except for a specified sub-range within said range, e.g. a MB within the slice. In the specified sub-range the second LUT is valid. In principle, the second tone mapping table overwrites the first tone mapping table for the specified sub-range. This principle can be extended over some or all available encoding levels.

According to another aspect of the invention, a signal comprises base layer video data and enhancement layer video data, the base layer having less color bit depth than the enhancement layer, wherein the base layer data comprise intra coded video data, and wherein the signal further comprises first tone mapping data relating to a first hierarchy level of the intra coded video data, e.g. a picture, and further comprises second tone mapping data relating to a defined fraction within said first hierarchy level of video data, e.g. a particular slice or MB. The first tone mapping data represent a first table for bit depth upsampling of pixels of said first hierarchy level of the base layer except said fraction, and the second tone mapping data represent a difference between a second table and the first table, wherein the second table is for bit depth upsampling of pixels of said fraction. The term "fraction" herein generally refers to picture units, such as MBs, pictures, GOPs and image sequences.

According to another aspect, respective devices are disclosed.

In one embodiment of the invention, an apparatus for encoding or decoding video data further comprises means for performing spatial (residual or texture) upsampling and means for performing color bit depth upsampling, wherein the means for spatial upsampling increases the number of values within the BL information and the means for color bit depth upsampling increases the color range of the values and wherein spatially and color bit depth upsampled BL data are obtained.

Various embodiments of the presented coding solution are compatible to H.264/AVC and all kinds of scalability that are defined in H.264/AVC scalable extension (SVC).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a framework of color bit depth scalable coding.

DETAILED DESCRIPTION OF THE INVENTION

Figure 1:
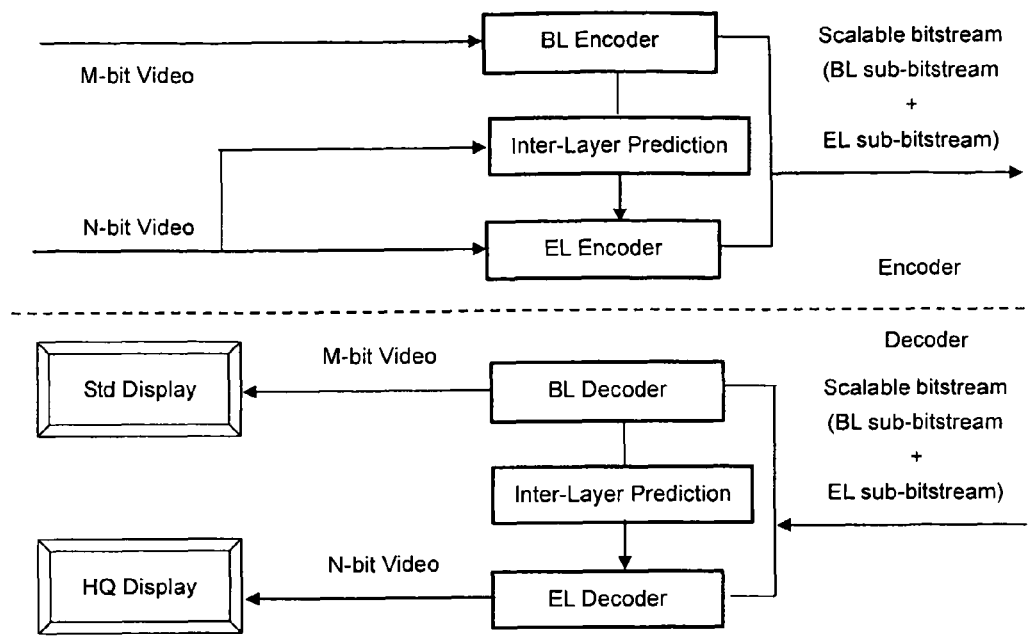

As shown in FIG. 1, two videos are used as input to the video encoder: N-bit raw video and M-bit (M<N, usually M=8) video. The M-bit video can be either decomposed from the N-bit raw video or given by other ways. The scalable solution can reduce the redundancy between two layers by using pictures of the BL. The two video streams, one with 8-bit color and the other with N-bit color (N>8), are input to the encoder, and the output is a scalable bit-stream. It is also possible that only one N-bit color data stream is input, from which an M-bit (M<N) color data stream is internally generated for the BL. The M-bit video is encoded as the BL using the included H.264/AVC encoder. The BL information can be used to improve the coding efficiency of the EL. This is called inter-layer prediction herein. Each picture—a group of MBs—has two access units, one for the BL and the other one for the EL. The coded bitstreams are multiplexed to form a scalable bitstream. The BL encoder comprises e.g. an H.264/AVC encoder, and the reconstruction is used to predict the N-bit color video, which will be used for the EL encoding.

As shown in FIG. 1, the scalable bit-stream exemplarily contains an AVC compliant BL bit-stream, which can be decoded by a BL decoder (conventional AVC decoder). Then the same prediction as in the encoder will be done at the decoder side (after evaluation of a respective indication) to get the predicted N-bit video. With the N-bit predicted video, the EL decoder will then use the N-bit prediction to generate the final N-bit video for a high-quality display HQ.

When the term color bit depth is used herein, it means bit depth, i.e. the number of bits per value. This is usually corresponding to color intensity, but may also refer to grayscale values in luminance channel Y.

In one embodiment, the present invention is based on the current structure of SVC spatial, temporal and quality scalability, and is enhanced by bit depth scalability for enhanced color bit depth. Hence, this embodiment is completely compatible to the current SVC standard. However, it will be easy for the skilled person to adapt it to other standards. The key of bit depth scalability is the bit depth inter-layer prediction. By using the inter-layer prediction, the difference between the N-bit and M-bit video is encoded as the EL.

The invention applies a LUT based inverse tone mapping technique for the inter-layer prediction of bit-depth scalable coding, which improves the coding efficiency. The LUT is created at the encoder, based on the relationship between the reconstructed BL encoding unit (GOP, image, slice or MB) and the collocated original EL encoding unit.

In general, one LUT is created for each luminance/chrominance channel: Y, Cb, and Cr. In practice, two or all three of these different channels may share the same LUT. If two or more different LUTs apply to the same encoding level, they may also be differentially encoded, e.g. $LUT_Y$, $LUT_{Cb-Y}$, $LUT_{CR-Y}$. Then the created LUTs are used during the inter-layer prediction at the encoder to de-correlate the redundancy between the BL and the EL. The LUTs are inserted into the bitstream and can be recovered at the decoder end. The decoder uses the same LUTs in the inter-layer prediction, and thus can reconstruct the EL with high quality.

Figure 5:
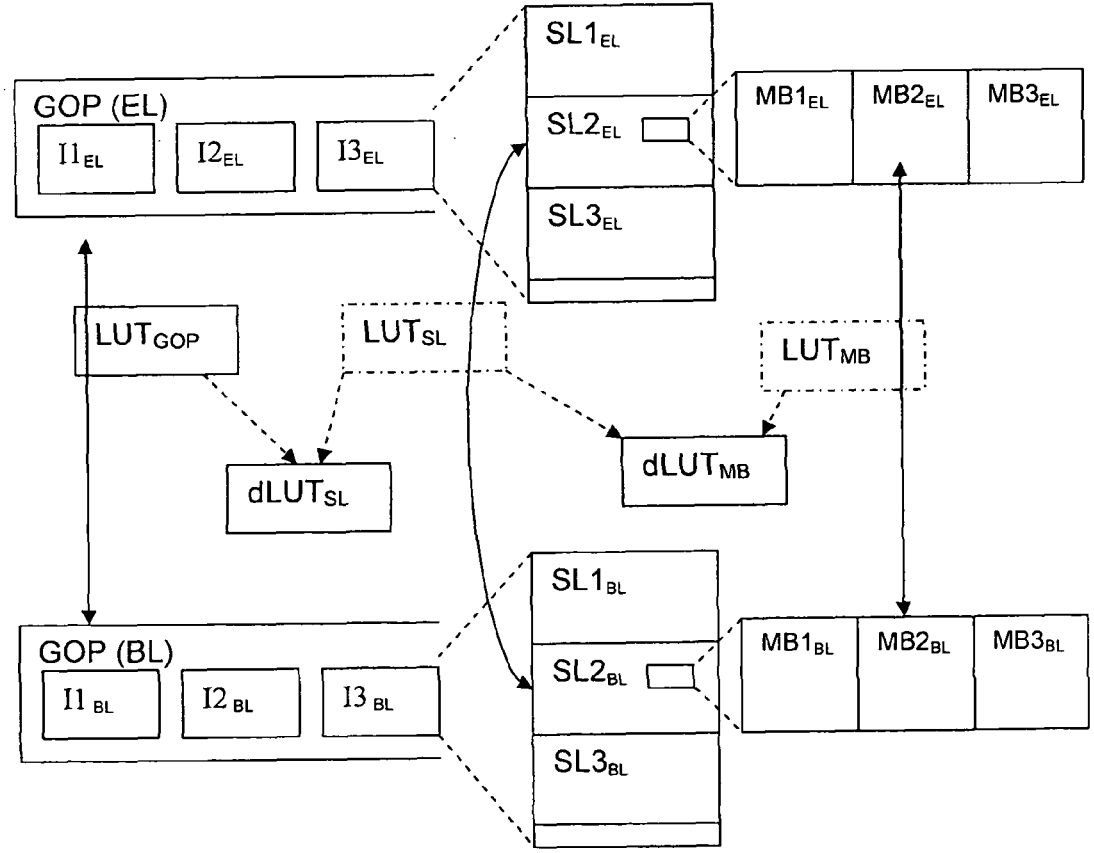
FIG. 5 another exemplary set of hierarchical look-up tables for tone mapping on GOP, slice and macroblock level.

The BL and the EL data to which a tone mapping LUT refers can be of any hierarchy level, e.g. sequence of pictures, picture, slice, macroblock (MB), block (in descending order). To de-correlate the LUTs of different levels, for each level (except for the highest) only the difference from its immediate higher level LUT is encoded. This differential look-up table is called "delta LUT". As an example, one LUT is generated for a highest level, e.g. GOP (group-of-pictures) level. Another LUT may be generated for sub-group level of e.g. 4 pictures. Then a difference table representing the difference between the sub-group LUT and the group/GOP LUT may be generated. A further LUT may be generated for a single picture. Then a respective delta LUT representing the difference between the sub-group LUT and the picture LUT is generated. In the same manner, further LUTs can be generated on slice level and MB level. For each of them, a delta LUT against its immediate higher level LUT is generated. This is shown in FIG. 5. It is however not necessary that a LUT is generated for each of the levels, e.g. the picture level may be skipped. Then the slice level delta LUT refers back to the next higher level, e.g. GOP level LUT. Likewise, it may happen that more than one LUT and delta LUT are generated for the same level. E.g. a first LUT/delta LUT refers to a first picture within a GOP (or sub-group) and a second LUT/delta LUT refers to another, second picture within the same GOP (or sub-group). Then the two delta LUTs refer back to the same GOP (or sub-group) LUT.

To further reduce the overhead of the LUTs in the bitstream, the LUTs and/or the delta LUTs of lower levels are encoded using a differential coding technique in one embodiment. The mathematical expression of the encoding and decoding process of the LUT is as follows.

Given NB and NE, representing the bit-depth of the base layer (BL) and the enhancement layer (EL) respectively, for a single channel the LUT to predict the EL signal from the BL signal is expressed as $LUT=\{V(0), V(1), \ldots, V(2^{NB}-1)\}$, with the levels of the BL being from 0 to $2^{NB}-1$ while the levels of the EL are from 0 to $2^{NE}-1$. Therefore, according to the LUT, a level i in the BL is mapped to the level V(i) in the EL during the inter-layer bit-depth prediction.

At the encoder, the highest level LUT is encoded by differentiating the adjacent values. Only the following values are entropy-encoded:

$$V(0), V(1)-V(0), V(2)-V(1), \ldots, V(2^{NB}-1)-V(2^{NB}-2) \quad (1)$$

The total number of entries is $2^{NB}$. As for the lower level LUTs, we first calculate the delta LUT for each level i, according to:

$$\Delta LUT^i = LUT^i - LUT^{i-1} \equiv \{V^i(0)-V^{i-1}(0), \quad V^i(1)-V^{i-1}(1), \ldots, V^i(2^{NB}-1)-V^{i-1}(2^{NB}-1)\} \quad (2)$$

The delta LUT is also encoded using the method in Eq. (1). Further, since many of the $V^i(k)-V^{i-1}(k)$ will be zero, a Huffman type of runlength encoding may be advantageous.

According to one aspect of the invention, the LUT based inverse tone mapping technique is only used when the BL data are intra-coded. This has the advantages that it is compliant to single-loop decoding of intra-coded images and fragments, as used e.g. in the current SVC standard, and that it is compatible to other types of scalabilities, as also supported in the current SVC standard.

Figure 2:
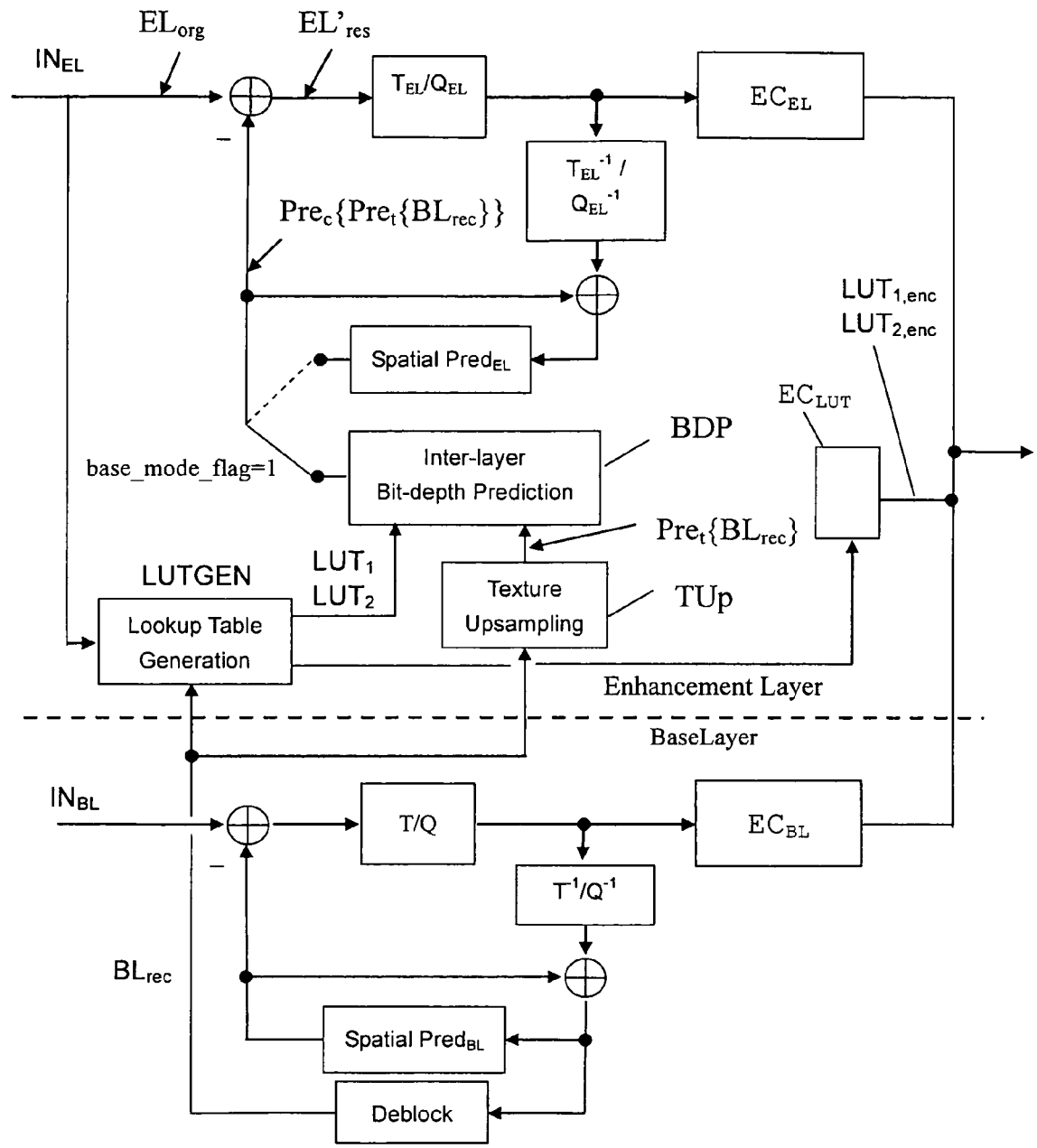
FIG. 2 an encoder for the extension of the intra texture inter-layer prediction of spatial scalability to color bit depth scalability.

FIG. 2 shows an encoder for the extension of intra texture inter-layer prediction of spatial scalability, as used in the current SVC standard, to bit depth scalability. The bit depth upsampling block BDUp together with the look-up table (LUT) generation block LUTGEN and the LUT entropy coding block $EC_{LUT}$ represent the extension to bit depth scalability, while the other blocks are also used for the spatial scalability. These blocks BDUp, LUTGEN, $EC_{LUT}$ and their connections are the difference between a conventional SVC intra encoder and the intra encoder according to the invention.

It is to be noted however that the bit-depth upsampling does not necessarily require spatial (texture), temporal or SNR upsampling. However, one advantage of the invention is that the different types of scalability can be combined.

In FIG. 2, M-bit base layer MBs are input to the BL encoder, and N-bit enhancement layer MBs are input to the EL encoder (N>M). In the current SVC standard, the texture upsampling was designed for spatial intra texture inter-layer prediction. In FIG. 2 the input to texture upsampling TUp is the reconstructed BL macroblock $BL_{rec}$, and the output is the spatially (texture) predicted version of the EL macroblock $Pre_t\{BL_{rec}\}$. Bit depth scalability is realized by the step of bit depth upsampling BDUp that (in this example) directly follows texture upsampling TUp. In practice, it is often advantageous to apply the texture upsampling as a spatial inter-layer prediction first, and then the bit depth upsampling BDUp is done as a bit depth inter-layer prediction. However, reverse order of the prediction steps is possible. With both the texture upsampling TUp and the bit depth upsampling BDUp, a predicted version of the N-bit EL macroblock $Pre_c\{Pre_t\{BL_{rec}\}\}$ is obtained. For each MB one out of at least two defined LUTs is used. The LUTs are generated in a LUT generation block LUTGEN, based on the characteristics of the reconstructed BL and the original EL image data. The LUTs are used by the bit depth upsampling block BDUp, and they are also output towards an encoder, since they are necessary for decoding and therefore must be transmitted to the decoder. As described above, the LUTs are encoded in a LUT entropy encoding unit $EC_{LUT}$.

The residual $EL'_{res}$ between the original N-bit EL macroblock $EL_{org}$ and its predicted version $Pre_c\{Pre_t\{BL_{rec}\}\}$ is obtained by a difference generator $D_{EL}$. In one embodiment of the invention, the residual is further transformed T, quantized Q and entropy encoded $EC_{EL}$ to form the EL sub-bit-stream, like in SVC. In a mathematical expression, the residual of color bit depth intra upsampling is $$EL'_{res} = EL_{org} - Pre_c\{Pre_t\{BL_{rec}\}\} \quad (3)$$

where $Pre_t\{\ \}$ represents the texture upsampling operator.

Different variations of the encoding process are possible, and can be controlled by control parameters. An exemplary flag base_mode_flag is shown in FIG. 2 that decides whether EL residuals are predicted based on reconstructed EL information or based on upsampled BL information.

In the following, an illustrative embodiment of the technical solution is presented to enable hierarchical LUT based inverse tone mapping in SVC bit-depth scalability. In detail, some new syntax elements are added to the sequence parameter set in scalable extension, as exemplarily shown in lines 25-41 of Tab.1. The following expressions are used:

inv_tone_map_flag equal to 1 specifies that the process of inverse tone mapping shall be invoked in the inter-layer prediction. inv_tone_map_flag equal to 0 specifies that no process of inverse tone mapping shall be invoked in the inter-layer prediction (default).

level_lookup_table_luma_minus8 plus 8 specifies the number of levels of the lookup table for Y channel.

offset_val_lookup_table_luma[i] specifies the value s[i] to which the level i in the lookup table for the Y channel is mapped to by the following way:

if i is not equal to 0, s[i] is equal to s[i−1] plus offset_val_lookup_table_luma[i], where s[i−1] is the value to which the level i−1 in the Y channel is mapped to.

If i is equal to 0, s[i] is equal to offset_val_lookup_table_luma[i].

TABLE 1

Exemplary implementation within Slice Header in scalable extension

| # | | C | Descriptor |
|---|---|---|---|
| 1 | seq_parameter_set_svc_extension( ) { | | |
| 2 | interlayer_deblocking_filter_control_present_flag | 0 | u(1) |
| 3 | extended_spatial_scalability | 0 | u(2) |
| 4 | if( chroma_format_idc = = 1 \|\| chroma_format_idc = = 2 ) | | |
| 5 | chroma_phase_x_plus1 | 0 | u(1) |
| 6 | if( chroma_format_idc = = 1 ) | | |
| 7 | chroma_phase_y_plus1 | 0 | u(2) |
| 8 | if( extended_spatial_scalability = = 1 ) { | | |
| 9 | if( chroma_format_idc > 0 ) { | | |
| 10 | base_chroma_phase_x_plus1 | 0 | u(1) |
| 11 | base_chroma_phase_y_plus1 | 0 | u(2) |
| 12 | } | | |
| 13 | scaled_base_left_offset | 0 | se(v) |
| 14 | scaled_base_top_offset | 0 | se(v) |
| 15 | scaled_base_right_offset | 0 | se(v) |
| 16 | scaled_base_bottom_offset | 0 | se(v) |
| 17 | } | | |
| 18 | if( extended_spatial_scalability = = 0 ) { | | |
| 19 | Avc_rewrite_flag | 0 | u(1) |
| 20 | if( avc_rewrite_flag ) { | | |
| 21 | avc_adaptive_rewrite_flag | 0 | u(1) |
| 22 | } | | |
| 23 | } | | |
| 24 | avc_header_rewrite_flag | 0 | u(1) |
| 25 | inv_tone_map_flag | 1 | u(1) |
| 26 | if( inv_tone_map_flag ) { | | |
| 27 | level_lookup_table_luma_minus8 | 1 | u(v) |
| 28 | for ( i=0; i<(1<<(8+ level_lookup_table_luma_minus8)); i++ ) { | | |
| 29 | offset_val_lookup_table_luma[ i ] | | se(v) |
| 30 | } | | |
| 31 | chroma_inv_tone_map_flag | 1 | u(1) |
| 32 | if( chroma_inv_tone_map_flag ) { | | |
| 33 | level_lookup_table_chroma_minus8 | 1 | u(v) |
| 34 | for( i=0; i<(1<<(8+ level_lookup_table_chroma_minus8)); i++ ) { | | |
| 35 | offset_val_lookup_table_cb[ i ] | 1 | se(v) |
| 36 | } | | |
| 37 | cr_inv_tone_map_flag | 1 | u(1) |
| 38 | if( cr_inv_tone_map_flag ) { | | |
| 39 | for( i=0; i<(1<<(8+ level_lookup_table_chroma_minus8)); i++ ) { | | |
| 40 | offset_val_lookup_table_cr[ i ] | 1 | se(v) |
| 41 | } | | |
| 42 | } } } } | | | chroma_inv_tone_map_flag equal to 1 specifies the process of inverse tone mapping shall be invoked in the inter-layer prediction for Cb and Cr channel.

level_lookup_table_chroma_minus8 plus 8 specifies the number of levels of the LUT for Cb and Cr channels.

offset_val_lookup_table_cb[i] specifies the value s[i] to which the level i in the lookup table for the Cb channel is mapped to by the following way:

if i is not equal to 0, s[i] is equal to s[i−1] plus offset_val_lookup_table_cb[i], where s[i−1] is the value to which the level i−1 in the Cb channel is mapped to if i is equal to 0, s[i] is equal to offset_val_lookup_table_cb[i].

cr_inv_tone_map_flag equal to 0 specifies that the LUT for Cb channel is re-used in the inter-layer prediction for Cr channel. cr_inv_tone_map_flag equal to 1 specifies that different lookup table other than the LUT for Cb channel is used in the inter-layer prediction for Cr channels.

offset_val_lookup_table_cr[i] specifies the value s[i] to which the level i in the LUT for the Cr channel is mapped to by the following way:

if i is not equal to 0, s[i] is equal to s[i−1] plus offset_val_lookup_table_cr[i], where s[i−1] is the value to which the level i−1 in the Cr channel is mapped to if i is equal to 0, s[i] is equal to offset_val_lookup_table_cr[i].

Tab.2 shows a picture parameter set, modified according to one embodiment of the invention. The invention is included in lines 49-68 of Tab.2.

TABLE 2

Exemplary implementation within Picture Parameter set

| # | pic_parameter_set_rbsp( ) { | C | Descr. |
|---|---|---|---|
| 1 | pic_parameter_set_id | 1 | ue(v) |
| 2 | seq_parameter_set_id | 1 | ue(v) |
| 3 | entropy_coding_mode_flag | 1 | u(1) |
| 4 | pic_order_present_flag | 1 | u(1) |
| 5 | num_slice_groups_minus1 | 1 | ue(v) |
| 6 | if( num_slice_groups_minus1 > 0 ) { | | |
| 7 |   slice_group_map_type | 1 | ue(v) |
| 8 |   if( slice_group_map_type = = 0 ) | | |
| 9 |     for( iGroup = 0; iGroup <= num_slice_groups_minus1; iGroup++ ) | | |
| 10 |       run_length_minus1[ iGroup ] | 1 | ue(v) |
| 11 |   else if( slice_group_map_type = = 2 ) | | |
| 12 |     for( iGroup = 0; iGroup < num_slice_groups_minus1; iGroup++ ) { | | |
| 13 |       top_left[ iGroup ] | 1 | ue(v) |
| 14 |       bottom_right[ iGroup ] | 1 | ue(v) |
| 15 |     } | | |
| 16 |   else if( slice_group_map_type = = 3 \|\| <br>      slice_group_map_type = = 4 \|\| <br>      slice_group_map_type = = 5 ) { | | |
| 17 |     slice_group_change_direction_flag | 1 | u(1) |
| 18 |     slice_group_change_rate_minus1 | 1 | ue(v) |
| 19 |   } else if( slice_group_map_type = = 6 ) { | | |
| 20 |     pic_size_in_map_units_minus1 | 1 | ue(v) |
| 21 |     for( i = 0; i <= pic_size_in_map_units_minus1; i++ ) | | |
| 22 |       slice_group_id[ i ] | 1 | u(v) |
| 23 |   } | | |
| 24 | } | | |
| 25 | num_ref_idx_l0_active_minus1 | 1 | ue(v) |
| 26 | num_ref_idx_l1_active_minus1 | 1 | ue(v) |
| 27 | weighted_pred_flag | 1 | u(1) |
| 28 | weighted_bipred_idc | 1 | u(2) |
| 29 | pic_init_qp_minus26 /* relative to 26 */ | 1 | se(v) |
| 30 | pic_init_qs_minus26 /* relative to 26 */ | 1 | se(v) |
| 31 | chroma_qp_index_offset | 1 | se(v) |
| 32 | deblocking_filter_control_present_flag | 1 | u(1) |
| 33 | constrained_intra_pred_flag | 1 | u(1) |
| 34 | redundant_pic_cnt_present_flag | 1 | u(1) |
| 35 | if( more_rbsp_data( ) ) { | | |
| 36 |   transform_8x8_mode_flag | 1 | u(1) |
| 37 |   pic_scaling_matrix_present_flag | 1 | u(1) |
| 38 |   if( pic_scaling_matrix_present_flag) | | |
| 39 |     for( i = 0; i < 6 + <br>      ( (chroma_format_idc != 3 ) ? 2 : 6 ) * transform_8x8_mode_flag; <br>      i++ ) { | | |
| 40 |       pic_scaling_list_present_flag[ i ] | 1 | u(1) |
| 41 |       if( pic_scaling_list_present_flag[ i ] ) | | |
| 42 |         if( i < 6 ) | | |
| 43 |           scaling_list( ScalingList4x4[ i ], 16, <br>          UseDefaultScalingMatrix4x4Flag[ i ] ) | 1 | |
| 44 |         else | | |
| 45 |           scaling_list( ScalingList8x8[ i − 6 ], 64, <br>          UseDefaultScalingMatrix8x8Flag[ i − 6 ] ) | 1 | |
| 46 |     } | | |
| 47 |   second_chroma_qp_index_offset | 1 | se(v) |
| 48 | } | | |
| 49 | inv_tone_map_delta_flag | 1 | u(1) |
| 50 | if( inv_tone_map_delta_flag ) { | | |
| 51 |   level_lookup_table_luma_minus8 | 1 | u(v) |
| 52 |   for ( i=0; i<(1<<(8+ level_lookup_table_luma_minus8)); i++ ) { | | |

TABLE 2-continued

Exemplary implementation within Picture Parameter set

| # | pic_parameter_set_rbsp( ) { | C | Descr. |
|---|---|---|---|
| 53 |       offset_val_lookup_table_luma_delta[ i ] | | se(v) |
| 54 |     } | | |
| 55 |     chroma_inv_tone_map_delta_flag | 1 | u(1) |
| 56 |     if( chroma_inv_tone_map_delta_flag ) { | | |
| 57 |       level_lookup_table_chroma_minus8 | 1 | u(v) |
| 58 |       for( i=0; i<(1<<(8+ level_lookup_table_chroma_minus8)); i++ ) { | | |
| 59 |         offset_val_lookup_table_cb_delta[ i ] | 1 | se(v) |
| 60 |       } | | |
| 61 |       cr_inv_tone_map_delta_flag | 1 | u(1) |
| 62 |       if( cr_inv_tone_map_delta_flag ) { | | |
| 63 |         for( i=0; i<(1<<(8+ level_lookup_table_chroma_minus8)); i++ ) { | | |
| 64 |           offset_val_lookup_table_cr_delta[ i ] | 1 | se(v) |
| 65 |         } | | |
| 66 |       } | | |
| 67 |     } | | |
| 68 |   } | | |
| 69 |   rbsp_trailing_bits( ) | 1 | |
| 70 | } | | | inv_tone_map_delta_flag equal to 1 specifies the presence of the delta value to be added to the inverse tone mapping specified in sequence parameter set (SPS) in the inter-layer prediction.

level_lookup_table_luma_minus8 plus 8 specifies the number of levels of the lookup table for Y channel.

offset_val_lookup_table_luma_delta[i] specifies the delta value s[i] to be added to the value specified in SPS to which the level i in the lookup table for the Y channel is mapped to by the following way: if i is not equal to 0, s[i] is equal to s[i−1] plus offset_val_lookup_table_luma_delta[i]. Otherwise, s[i] is equal to offset_val_lookup_table_luma_delta[i].

chroma_inv_tone_map_delta_flag equal to 1 specifies the presence of the delta value to be added to the inverse tone mapping specified in SPS in the inter-layer prediction for Cb and Cr channel.

level_lookup_table_chroma_minus8 plus 8 specifies the number of levels of the LUT for Cb and Cr channels.

offset_val_lookup_table_cb_delta[i] specifies the delta value s[i] to be added to the value specified in SPS to which the level i in the lookup table for the Cb channel is mapped to by the following way:

if i is not equal to 0, s[i] is equal to s[i−1] plus offset_val_lookup_table_cb_delta[i]. Otherwise, s[i] is equal to offset_val_lookup_table_cb_delta[i].

cr_inv_tone_map_delta_flag equal to 0 specifies that the delta values for the Cb channel is re-used for Cr channel. cr_inv_tone_map_delta_flag equal to 1 specifies that different delta values other than those for the Cb channel is used.

offset_val_lookup_table_cr_delta[i] specifies the delta value s[i] to be added to the value specified in SPS to which the level i in the lookup table for the Cr channel is mapped to by the following way:

if i is not equal to 0, s[i] is equal to s[i−1] plus offset_val_lookup_table_cr_delta[i]. Otherwise, s[i] is equal to offset_val_lookup_table_cr_delta[i].

An exemplarily extended slice header in scalable extension is provided in Tab.3. The invention is included in lines 46-67.

TABLE 3

Exemplary Slice Header in Scalable Extension

| # | slice_header_in_scalable_extension( ) { | C | Descriptor |
|---|---|---|---|
| 1 |   first_mb_in_slice | 2 | ue(v) |
| 2 |   slice_type | 2 | ue(v) |
| 3 |   pic_parameter_set_id | 2 | ue(v) |
| 4 |   frame_num | 2 | u(v) |
| 5 |   if( !frame_mbs_only_flag ) { | | |
| 6 |     field_pic_flag | 2 | u(1) |
| 7 |     if( field_pic_flag ) | | |
| 8 |       bottom_field_flag | 2 | u(1) |
| 9 |   } | | |
| 10 |   if( nal_unit_type = = 21 ) | | |
| 11 |     idr_pic_id | 2 | ue(v) |
| 12 |   if( pic_order_cnt_type = = 0 ) { | | |
| 13 |     pic_order_cnt_lsb | 2 | u(v) |
| 14 |     if( pic_order_present_flag && !field_pic_flag ) | | |
| 15 |       delta_pic_order_cnt_bottom | 2 | se(v) |
| 16 |   } | | |
| 17 |   if( pic_order_cnt_type = = 1 && !delta_pic_order_always_zero_flag ) { | | |
| 18 |     delta_pic_order_cnt[ 0 ] | 2 | se(v) |
| 19 |     if( pic_order_present_flag && !field_pic_flag ) | | |
| 20 |       delta_pic_order_cnt[ 1 ] | 2 | se(v) |
| 21 |   } | | |
| 22 |   if( redundant_pic_cnt_present_flag ) | | |
| 23 |     redundant_pic_cnt | 2 | ue(v) |
| 24 |   if( slice_type = = EB ) | | |

TABLE 3-continued

Exemplary Slice Header in Scalable Extension

| # | slice_header_in_scalable_extension( ) { | C | Descriptor |
|---|---|---|---|
| 25 | direct_spatial_mv_pred_flag | 2 | u(1) |
| 26 | if( quality_id = = 0 ) { | | |
| 27 | if( slice_type = = EP \|\| slice_type = = EB ) { | | |
| 28 | num_ref_idx_active_override_flag | 2 | u(1) |
| 29 | if( num_ref_idx_active_override_flag ) { | | |
| 30 | num_ref_idx_l0_active_minus1 | 2 | ue(v) |
| 31 | if( slice_type = = EB ) | | |
| 32 | num_ref_idx_l1_active_minus1 | 2 | ue(v) |
| 33 | } | | |
| 34 | } | | |
| 35 | Ref_pic_list_reordering( ) | 2 | |
| 36 | if( ! layer_base_flag ) { | | |
| 37 | base_id | 2 | ue(v) |
| 38 | adaptive_prediction_flag | 2 | u(1) |
| 39 | if( ! adaptive_prediction_flag ) { | | |
| 40 | default_base_mode_flag | 2 | u(1) |
| 41 | if( ! default_base_mode_flag ) { | | |
| 42 | adaptive_motion_prediction_flag | 2 | u(1) |
| 43 | if( ! adaptive_motion_prediction_flag ) | | |
| 44 | default_motion_prediction_flag | 2 | u(1) |
| 45 | } | | |
| 46 | inv_tone_map_delta_flag | 1 | u(1) |
| 47 | if( inv_tone_map_delta_flag ) { | | |
| 48 | level_lookup_table_luma_minus8 | 1 | u(v) |
| 49 | for( i=0; i<(1<<(8+ level_lookup_table_luma_minus8)); i++ ) { | | |
| 50 | offset_val_lookup_table_luma_delta[ i ] | 1 | se(v) |
| 51 | } | | |
| 52 | chroma_inv_tone_map_delta_flag | 1 | u(1) |
| 53 | if( chroma_inv_tone_map_delta_flag ) { | | |
| 54 | level_lookup_table_chroma_minus8 | 1 | u(v) |
| 55 | for( i=0; i<(1<<(8+ level_lookup_table_chroma_minus8)); | | |
| 56 | i++ ) { | | |
| 57 | offset_val_lookup_table_cb_delta[ i ] | 1 | se(v) |
| 58 | } | | |
| 59 | cr_inv_tone_map_delta_flag | 1 | u(1) |
| 60 | if ( cr_inv_tone_map_delta_flag ) { | | |
| 61 | for( i=0; i<(1<<(8+ level_lookup_table_chroma_minus8)); | | |
| 62 | i++ ) { | | |
| 63 | offset_val_lookup_table_cr_delta[ i ] | 1 | se(v) |
| 64 | } | | |
| 65 | } | | |
| 66 | } | | |
| 67 | } | | |
| 68 | } | | |
| 69 | adaptive_residual_prediction_flag | 2 | u(1) |
| 70 | } | | |
| 71 | if( ( weighted_pred_flag && slice_type = = EP ) \|\| | | |
| | ( weighted_bipred_idc = = 1 && slice_type = = EB ) ) { | | |
| 72 | if( adaptive_prediction_flag) | | |
| 73 | base_pred_weight_table_flag | 2 | u(1) |
| 74 | if( layer_base_flag \|\| base_pred_weight_table_flag = = 0 ) | | |
| 75 | pred_weight_table( ) | | |
| 76 | } | | |
| 77 | if( nal_ref_idc != 0 ) { | | |
| 78 | dec_ref_pic_marking( ) | 2 | |
| 79 | if( use_base_prediction_flag && nal_unit_type != 21 ) | | |
| 80 | dec_ref_pic_marking_base( ) | | |
| 81 | } | | |
| 82 | } | | |
| 83 | if( entropy_coding_mode_flag && slice_type != EI ) | | |
| 84 | cabac_init_idc | 2 | ue(v) |
| 85 | slice_qp_delta | 2 | se(v) |
| 86 | if( deblocking_filter_control_present_flag ) { | | |
| 87 | disable_deblocking_filter_idc | 2 | ue(v) |
| 88 | if( disable_deblocking_filter_idc != 1 ) { | | |
| 89 | slice_alpha_c0_offset_div2 | 2 | se(v) |
| 90 | slice_beta_offset_div2 | 2 | se(v) |
| 91 | } | | |
| 92 | } | | |
| 93 | if( interlayer_deblocking_filter_control_present_flag ) { | | |
| 94 | disable_interlayer_deblocking_filter_idc | 2 | ue(v) |
| 95 | if( disable_interlayer_deblocking_filter_idc != 1 ) { | | |
| 96 | interlayer_slice_alpha_c0_offset_div2 | 2 | se(v) |
| 97 | interlayer_slice_beta_offset_div2 | 2 | se(v) |
| 98 | } | | |
| 99 | } | | |

TABLE 3-continued

Exemplary Slice Header in Scalable Extension

| # | slice_header_in_scalable_extension( ) { | C | Descriptor |
|---|---|---|---|
| 100 | constrained_intra_upsampling_flag | 2 | u(1) |
| 101 | if( quality_id = = 0 ) | | |
| 102 | if( num_slice_groups_minus 1 > 0 && slice_group_map_type >= 3 && slice_group_map_type <= 5) | | |
| 103 | slice_group_change_cycle | 2 | u(v) |
| 104 | if( quality_id = = 0 && extended_spatial_scalability > 0 ) { | | |
| 105 | if ( chroma_format_idc > 0 ) { | | |
| 106 | base_chroma_phase_x_plus1 | 2 | u(2) |
| 107 | base_chroma_phase_y_plus1 | 2 | u(2) |
| 108 | } | | |
| 109 | if( extended_spatial_scalability = = 2 ) { | | |
| 110 | scaled_base_left_offset | 2 | se(v) |
| 111 | scaled_base_top_offset | 2 | se(v) |
| 112 | scaled_base_right_offset | 2 | se(v) |
| 113 | scaled_base_bottom_offset | 2 | se(v) |
| 114 | } | | |
| 115 | } | | |
| 116 | if( use_base_prediction_flag ) | | |
| 117 | store_base_rep_flag | 2 | u(1) |
| 118 | if( quality_id = = 0 ) { | | |
| 119 | if( BaseFrameMbsOnlyFlag && !frame_mbs_only_flag && !field_pic_flag) | | |
| 120 | base_frame_and_bottom_field_coincided_flag | 2 | u(1) |
| 121 | else if( frame_mbs_only_flag && !BaseFrameMbsOnlyFlag && !BaseFieldPicFlag ) | | |
| 122 | base_bottom_field_coincided_flag | 2 | u(1) |
| 123 | } | | |
| 124 | SpatialScalabilityType = spatial_scalability_type( ) /* [Ed.: should be moved to semantics and delete syntax function ] */ | | |
| 125 | } | | |

In one embodiment, a first LUT is generated based upon an original EL slice and an upsampled reconstructed BL slice. A second LUT is generated based upon one or more MBs of the original EL slice and the collocated MB(s) of the upsampled reconstructed BL slice. The two LUTs are differentially encoded as LUT/delta LUT, as described above. Thus, the first LUT can be used at the decoder to map the upsampled reconstructed BL slice (except those MBs to which the second LUT refers) to an EL slice, and the second LUT can be used at the decoder to map those MBs to which it refers. This method of generating LUTs has the advantage that decoding can be optimized because the LUTs define a mapping between a slice that is available at the decoder (the upsampled reconstructed BL slice) and the EL slice with the highest available quality, namely the original EL slice. An advantage of using hierarchical LUTs is that the set of LUTs is optimally adapted to the actual video data, since large parts of a slice are often homogeneous, while some smaller areas within the slice may differ. Advantageously, separate differential LUTs are defined for these areas. Thus, the method is optimally adapted to the decoder needs and to highest quality reconstruction.

In one embodiment, the LUTs are encoded and transmitted together with the EL data. The EL data are predicted at the encoder from the reconstructed BL data, using these LUTs, and the residual is intra-coded and transmitted. Then the LUTs are applied at the decoder to the reconstructed BL data, and the residual is added. The result is a decoded EL picture with higher color bit-depth.

It is advantageous to insert the added syntax elements to support LUT based inverse tone mapping into the header, e.g. slice_header_in_scalable_extension for slice level:

In practice, different units (pictures, slices, MBs) can have different LUTs. Adding the new syntax elements in the headers of the respective levels allows flexibility of employing inverse tone mapping. E.g. in the case of object-based segmentation of slices, the different slices owe different characteristics and the relationship between BL slice and collocated EL slice could be quite different among different slices. Therefore, it may be beneficial to create different LUTs for different slices. On the other hand, characteristics and the relationship between BL slice and collocated EL slice can be constant over a sequence of several pictures. In this case, a higher-level LUT can be generated for a higher level (e.g. sequence or GOP level), and a lower-level LUT for a region (e.g. slice, group of MBs, MB) within one, some or all of these pictures. In one embodiment the lower-level LUT is associated to a defined particular region in each of the pictures. In another embodiment it is possible to associate a single lower-level LUT to a respective region within each of the pictures of a sequence. In one embodiment, a MB has an associated delta LUT and the next MB in sequence has an indication for re-applying the same delta LUT as the previous MB. The same principle can be applied on other encoding levels than MB.

Figure 3:
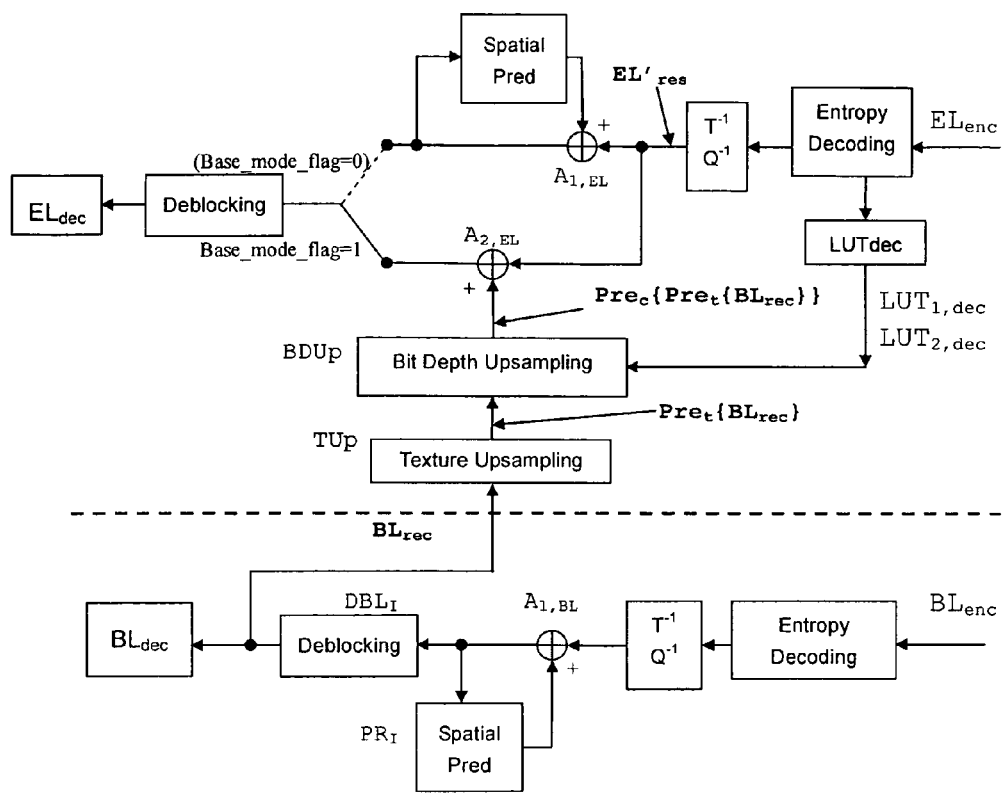
FIG. 3 a decoder for the extension of the intra texture inter-layer prediction of spatial scalability to color bit depth scalability.

FIG. 3 shows an exemplary decoder for intra coded BL images that utilizes inter-layer prediction. After receiving encoded BL and EL information $BL_{enc}$, $EL_{enc}$ with encoded LUTs according to the invention, e.g. in a multiplexed packetized bitstream, and separating BL, EL and LUT information, the BL information, EL information and the LUTs are entropy decoded. In this example, the LUTs are included in the EL information. Then inverse quantization $Q^{-1}$ and inverse transformation $T^{-1}$ are applied to the video data, and the hierarchical LUTs $LUT_1$, $LUT_2$ are decoded in a LUT decoding unit LUTdec. The LUT decoding unit reconstructs the higher-level LUT, the delta LUT and finally the lower-level LUT, and provides the two or more decoded look-up tables for the bit-depth prediction unit BDUp. The reconstructing of the highest-level LUT encoded according to Eq.1 can use ($V_{enc}$ being the encoded values)

$$V(0) = V_{enc}(0),$$

$$V(1) = V(0) - V_{enc}(1)$$

$$V(2) = V(1) - V_{enc}(2) \qquad (5)$$

$$\ldots,$$

$$V(2^{NB}-1) = V(2^{NB}-2) - V_{enc}(2^{NB}-1) \qquad (4)$$

The reconstructing of lower-level LUTs encoded according to Eq.2 can use $$LUT^{i-1} = LUT^i - \Delta LUT^i = \{V^i(0) - dV^i(0), \quad V^i(1) - dV^i(1), \ldots, V^i(2^{NB}-1) - dV^i(2^{NB}-1)\} \qquad (5)$$

where usually most of the $dV^i(k)$ are zero.

For the BL, the processing of intra encoded images is the same as for conventional SVC: the images are reconstructed using spatial intra prediction, i.e. based on previously reconstructed information of the same image. After de-blocking, the resulting BL signal $BL_{rec}$ can be displayed on a standard SVC display with 8 bit color depth. This signal can also be used to generate a predicted version of the collocated EL image $Pre_c\{Pre_t\{BL_{rec}\}\}$: for this purpose it is texture upsampled TUp, wherein a texture predicted version of the EL image $Pre_t\{BL_{rec}\}$ is obtained, which is then bit-depth upsampled BDUp-using the extracted and decoded look-up table. The texture and bit depth upsampled reconstructed BL image $Pre_c\{Pre_t\{BL_{rec}\}\}$ is then used to update $A_{2,EL}$ the improved, inverse quantized and inverse transformed EL residual $EL'_{res}$, thereby obtaining a signal that after de-blocking can be output as EL video $EL_{rec}$ for HQ displays.

Of course a decoder that is operated in EL mode will generate internally also the BL video $BL_{rec}$, since it is required for EL prediction, but the BL video needs not necessarily be available at the decoder output. In one embodiment the decoder has two outputs, one for BL video $BL_{rec}$ and one for EL video $EL_{rec}$, while in another embodiment it has only an output for EL video $EL_{rec}$.

For the EL MBs of which the collocated BL MBs are inter-coded, there is no constraint that the same LUTs based inter-layer prediction as in the case where the collocated BL MBs are intra-coded has to be used. E.g. linear scaling can serve as the method for bit-depth upsampling in the case that the collocated BL MBs are inter-coded.

As described above for the intra encoder of FIG. 2, also the decoder can work in different modes corresponding to the encoding. Therefore respective flags are extracted from the bitstream and evaluated, e.g. an indication base_mode_flag that decides whether or not inter-layer prediction is used. If not, EL images are conventionally reconstructed using de-blocking, spatial prediction and update $A_{1,EL}$ of the spatially predicted image.

In one embodiment of the invention, an apparatus for encoding video data having a base layer and an enhancement layer, wherein pixels of the base layer have less color bit depth than pixels of the enhancement layer, comprises encoding means T,Q for encoding base layer data on a first granularity level, wherein the base layer data are intra-coded, means $T^{-1},Q^{-1}$ for reconstructing the encoded base layer data, means for generating for the intra-coded base layer data a first tone mapping table $LUT_{GOP}$ defining a tone mapping between the original enhancement layer data and the corresponding reconstructed base layer data $Pre_t\{BL_{rec}\}$, means for generating for a fraction, e.g. a MB, of the intra-coded base layer data a different second tone mapping table $LUT_{MB}$ defining a tone mapping between said fraction of the original enhancement layer data $EL_{org}$ and the corresponding fraction of the reconstructed base layer data $Pre_t\{BL_{rec}\}$, means for generating a difference table $dLUT_{MB}$ representing the difference between the first and the second tone mapping table $LUT_{GOP}$, $LUT_{MB}$, means BDUp for bit-depth upsampling the reconstructed base layer data based on said first and second tone mapping tables, wherein the second tone mapping table is used only for said fraction of the reconstructed base layer and wherein a predicted version $Pre_c\{Pre_t\{BL_{rec}\}\}$ of the corresponding enhancement layer data is obtained that has higher bit-depth resolution than the base layer data, means for generating an enhancement layer residual $EL'_{res}$ being the difference between the original enhancement layer data and the corresponding predicted version of the enhancement layer data $Pre_c\{Pre_t\{BL_{rec}\}\}$, and means for encoding the enhancement layer residual, the first tone mapping table $LUT_{GOP}$ and said difference table $dLUT_{MB}$, wherein the encoded first tone mapping table is associated with the encoded base layer or enhancement layer data and the difference table is associated with said fraction of the encoded base layer data or enhancement layer data.

In one embodiment, the apparatus for encoding further comprises means TUp for upsampling the reconstructed base layer data $BL_{rec}$ before said bit-depth upsampling, wherein a first predicted version $Pre_t\{BL_{rec}\}$ of the corresponding enhancement layer data is obtained that has higher spatial, temporal or SNR resolution than the base layer data and that is used for said bit-depth upsampling step.

In one embodiment of the invention, an apparatus for decoding video data having a base layer and an enhancement layer comprises means for extracting from encoded enhancement layer data $EL_{enc}$ or base layer data $BL_{ENC}$ first and second tone mapping data relating to intra-coded enhancement layer data, means for reconstructing a first tone mapping table $LUT_{GOP}$ from the extracted tone mapping data, means for reconstructing a second tone mapping table $LUT_{MB}$ from the extracted tone mapping data and said reconstructed first tone mapping table, wherein the utilized extracted tone mapping data represent the difference $dLUT_{MB}$ between said first and second tone mapping table, means for determining a first encoding unit to which the first tone mapping table relates, and a second encoding unit to which the second tone mapping table relates, wherein the second encoding unit is a fraction of said first encoding unit, means $T^{-1},Q^{-1}$ for performing inverse quantization and inverse transformation on received base layer data and enhancement layer data, wherein inverse quantized and inverse transformed enhancement layer data comprise a residual $EL'_{res}$, means $A_{1,BL}$, $PR_I$, $DBL_I$ for reconstructing intra-coded base layer data, means BDUp for upsampling reconstructed base layer data $BL_{rec}$, wherein the value depth per pixel is increased and wherein for pixels in said second encoding unit the second tone mapping table is used and for remaining pixels of the first encoding unit the first tone mapping table is used, and wherein predicted enhancement layer data $Pre_c\{Pre_t\{BL_{rec}\}\}$ are obtained, and means $A_{2,EL}$ for reconstructing from the predicted enhancement layer data $Pre_c\{Pre_t\{BL_{rec}\}\}$ and the inverse quantized and inverse transformed enhancement layer data reconstructed enhancement layer video data.

Exemplarily, in one embodiment an apparatus for decoding video data having a base layer and an enhancement layer comprises means for extracting from encoded enhancement layer data or base layer data first and second tone mapping data from one or more headers of intra-coded enhancement layer data, means for reconstructing a first tone mapping table from the extracted tone mapping data, means for reconstructing a second tone mapping table from the extracted tone mapping data and said reconstructed first tone mapping table, wherein the utilized extracted tone mapping data represent the difference between said first and second tone mapping table, means for performing inverse quantization and inverse transformation on received base layer data and enhancement layer data, wherein inverse quantized and inverse transformed enhancement layer data comprise a residual, means for reconstructing intra-coded base layer data means for upsampling reconstructed base layer data, wherein the number of pixels is increased and the value depth per pixel is increased, wherein for first intra-coded data units the first tone mapping table is used and for second intra-coded data units being included in the first data units the second tone mapping table is used, and wherein predicted enhancement layer data are obtained, and means for reconstructing from the predicted EL data and the inverse quantized and inverse transformed EL information reconstructed EL video information.

It is to be noted that the terms "tone mapping" and "inverse tone mapping" describe the same process from different viewpoints. They are therefore used synonymously herein. E.g. in JVT the term "inverse tone mapping" is used to describe prediction of high bit-depth (i.e. EL) from low bit-depth (i.e. BL). However, the terminology used herein shall not be understood as precluding applicability of the invention to JVT. The same may apply to other standards.

Further, not all intra-coded parts of the BL image need to use LUT based inverse tone mapping. Whether or not the LUT based inverse tone mapping technique is applied can be determined by some distortion measurement technique. If the LUT based inverse tone mapping technique is determined to be used, then e.g. INTRA_BL mode will be selected; if not, the common AVC tools can be used to encode the current EL MB.

Due to the different number of possible colors in BL and EL, each BL color can map to different EL colors. Usually these different EL colors are very similar, and therefore "neighbors" in a color scale or color gamut.

Figure 4:
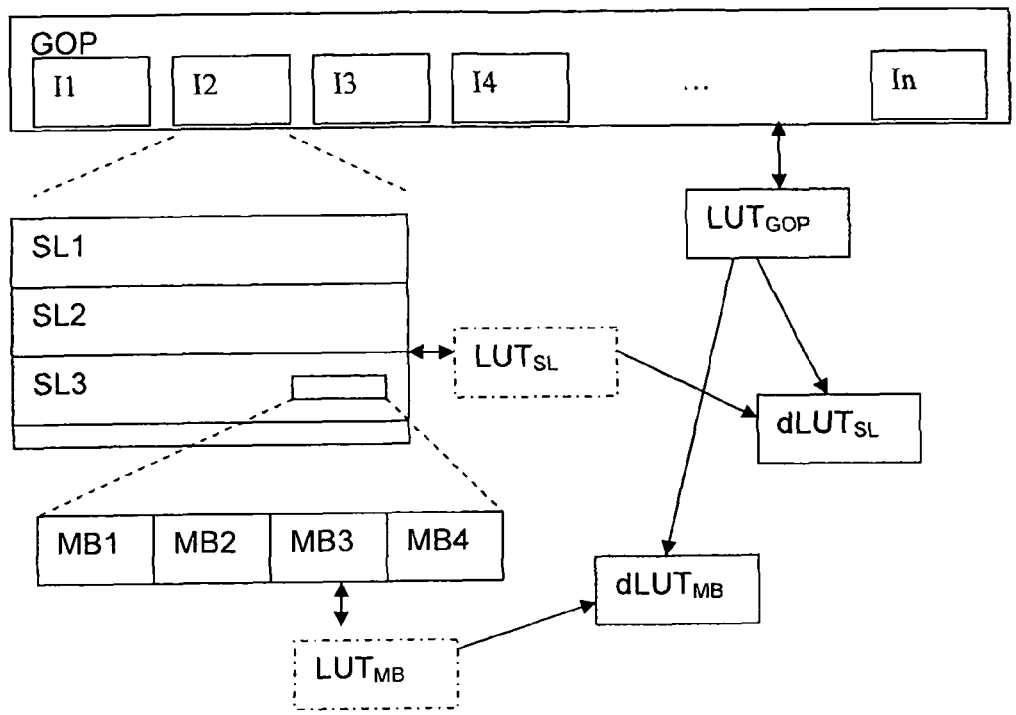
FIG. 4 an exemplary set of hierarchical look-up tables for tone mapping on GOP, slice and macroblock level.

FIG. 4 shows an exemplary set of hierarchical look-up tables for tone mapping on GOP, slice and MB level. A GOP contains several pictures $I_1, I_2, \ldots, I_n$ with similar characteristics in respect to high bit-depth colors. E.g. a particular color is used more frequently than its "neighbor" color. Exemplarily, at least one of the pictures, e.g. $I_2$, contains a number of slices $SL_1, SL_2, SL_3$, and in the EL of one of the slices $SL_2$ that particular neighbor color is used less often than another, second neighbor color. Further, in one of the slices $SL_3$ one or more macroblocks are included where also that particular neighbor color is used less often than said second (or another third) neighbor color. A first tone mapping look-up table $LUT_{GOP}$, which is transmitted, defines a general mapping on GOP level between BL and EL. Further, a $2^{nd}$ tone mapping look-up table $LUT_{SL}$ defines a different mapping for said color on slice level, referring only to the respective slice $SL_2$ and to that particular BL color. The $2^{nd}$ tone mapping look-up table $LUT_{SL}$ is differentially encoded into a "delta LUT" $dLUT_{SL}$, which is then transmitted. Both tables are associated to their respective region (i.e. GOP and slice) to which they refer, e.g. by an indication or by insertion into the respective headers. Further, another $3^{rd}$ tone mapping look-up table $LUT_{MB}$ is generated and used for said one or more macroblocks $MB_1, MB_2, MB_3, MB_4$ in one of the slices. This $3^{rd}$ tone mapping look-up table $LUT_{MB}$ is also differentially encoded, namely relative to the table of the highest level ($LUT_{GOP}$ in this example). The delta LUT $dLUT_{MB}$ is then associated to the respective MB or MBs to which it refers, and transmitted.

FIG. 5 shows another exemplary set of hierarchical tone mapping look-up tables for tone mapping on GOP, slice and MB level. It is similar to FIG. 4, except that the lower-level tone mapping look-up table $LUT_{MB}$ is encoded relative to its immediate higher level ($LUT_{SL}$ in this example). Due to the characteristics of natural video, this encoding may be more appropriate than the reference back to the highest level LUT, as in FIG. 4. Further, the MBs to which the MB-level tone mapping LUT refers are located within a slice $SL_2$ that already has a separate tone mapping LUT associated. The slice level table $LUT_{SL}$ overrules the GOP level table $LUT_{GOP}$ only for $SL_2$, and the MB level table $LUT_{MB}$ overrules both the GOP level table $LUT_{GOP}$ and the slice level table $LUT_{SL}$ for $MB_2$. Additionally, another MB level LUT may be generated e.g. for $MB_3$. In one embodiment, the MB level look-up table may refer to more than one macroblock, e.g. to $MB_1$ and $MB_2$.

Generally, in regions where a lower-level tone mapping table does not apply it is ignored (e.g. $LUT_{MB}$ is ignored for $MB_1$ in FIG. 5). Moreover, a lower-level tone mapping table may be implicitly generated, e.g. by performing the mapping step in two sub-steps: first a particular input value is looked-up in the lower-level LUT, and if it is determined that the lower-level LUT defines an output value for the particular input value then this output value is used. If however the lower-level LUT does not define an output value for the particular input value, e.g. because the lower-level LUT is only a partial LUT, then the input value is looked-up in the higher-level LUT. If there are more than two hierarchy levels above, the two or more higher-level LUTs are searched through successively starting from the immediate higher level, until one provides an output value for the input value.

One advantage of the presented hierarchical look-up table approach for extension of the spatial scalability to bit depth scalability is that the amount of data to be transmitted is very low, since the look-up tables are individually adapted to the contents of the image and are compressed. Thus, the amounts of control data (ie. the LUT data) as well as the actual video data are minimized. Further, no new prediction mode is needed to realize the extension to color bit depth scalability.

Further advantages of the present invention are the complete compatibility to other types of scalability, robustness and extendibility to advanced techniques. In particular, the present invention improves the coding efficiency while still keeping a single-loop decoding framework to apply the LUT-based inverse tone mapping only to base layer intra coded pictures or picture parts.

It is also an advantage that due to usage of reconstructed BL data for the upsampling and the generation of the look-up tables, the prediction at the encoder side is better adapted to the prediction at the decoder side, so that the residuals are better and at the decoder side better prediction and reconstruction results can be achieved.

The invention can be used for scalable encoders, scalable decoders and scalable signals, particularly for video-signals or other types of signals that have different quality layers and high inter-layer redundancy.

It will be understood that the present invention has been described purely by way of example, and modifications of detail can be made without departing from the scope of the invention. Each feature disclosed in the description and where appropriate the claims and drawings may be provided independently or in any appropriate combination. Features may where appropriate be implemented in hardware, software, or a combination of the two. Reference numerals appearing in the claims are by way of illustration only and shall have no limiting effect on the scope of the claims.

What is claimed is:

1. A method for encoding video data having a base layer and an enhancement layer, wherein pixels of the base layer have less color bit depth than pixels of the enhancement layer, the method comprising:
   encoding base layer data on a first granularity level, wherein the base layer data are intra-coded;
   reconstructing the encoded base layer data;
   generating for the intra-coded base layer data a first tone mapping table defining a tone mapping between original enhancement layer data and corresponding reconstructed base layer data;
   generating for a fraction of the intra-coded base layer data a different second tone mapping table defining a tone mapping between said fraction of the original enhancement layer data and the corresponding fraction of the reconstructed base layer data;
   generating a difference table representing the difference between the first tone mapping table and the second tone mapping table;
   bit-depth upsampling the reconstructed base layer data based on said first and second tone mapping tables, wherein the second tone mapping table is used only for said fraction of the reconstructed base layer and the first tone mapping table is used for the remainder of the reconstructed base layer, and wherein a predicted version of the corresponding enhancement layer data is obtained that has higher bit-depth resolution than the base layer data;
   generating an enhancement layer residual being the difference between the original enhancement layer data and the corresponding predicted version of the enhancement layer data; and
   encoding the enhancement layer residual, the first tone mapping table and said difference table, wherein the encoded first tone mapping table is associated with the encoded base layer or enhancement layer data and the difference table is associated with said fraction of the encoded base layer data or enhancement layer data.

2. The method according to claim 1, further comprising upsampling the reconstructed base layer data before said bit-depth upsampling, wherein a first predicted version of the corresponding enhancement layer data is obtained that has higher spatial, temporal or SNR resolution than the base layer data and that is used for said bit-depth upsampling.

3. The method according to claim 1, wherein the first tone mapping table or the difference table, or both, are entropy coded, wherein an entry is represented by a differential value relating to a previous entry.

4. The method according to claim 1, wherein separate tone mapping tables are generated for luminance and chrominance channels.

5. The method according to claim 1, wherein no tone mapping tables are generated for inter coded base layer data.

6. A method for decoding video data having a base layer and an enhancement layer, the method comprising:
   extracting from encoded enhancement layer data or base layer data first and second tone mapping data relating to intra-coded enhancement layer data;
   reconstructing a first tone mapping table from the extracted tone mapping data;
   reconstructing a second tone mapping table from the extracted tone mapping data and said reconstructed first tone mapping table, wherein the extracted tone mapping data represent the difference between said first tone mapping table and said second tone mapping table;
   determining a first encoding unit to which the first tone mapping table relates, and a second encoding unit to which the second tone mapping table relates, wherein the second encoding unit is a fraction of said first encoding unit;
   performing inverse quantization and inverse transformation on received base layer data and enhancement layer data, wherein inverse quantized and inverse transformed enhancement layer data comprise a residual;
   reconstructing intra-coded base layer data;
   upsampling the reconstructed base layer data, wherein a value depth per pixel is increased and wherein for pixels in said second encoding unit the second tone mapping table is used and for remaining pixels of the first encoding unit the first tone mapping table is used, and wherein predicted enhancement layer data are obtained; and
   reconstructing from the predicted enhancement layer data and the inverse quantized and inverse transformed enhancement layer data reconstructed enhancement layer video data.

7. The method according to claim 6, wherein upsampling comprises also one or more of spatial, temporal or SNR upsampling.

8. The method according to claim 6, wherein said first or said differential second tone mapping table, or both, are differentially encoded.

9. An apparatus for encoding video data having a base layer and an enhancement layer, wherein pixels of the base layer have less color bit depth than pixels of the enhancement layer, the apparatus comprising a memory device and a processor configured to:
   encode base layer data on a first granularity level, wherein the base layer data are intra-coded;
   reconstruct the encoded base layer data;
   generate an enhancement layer residual; and
   encode the enhancement layer residual;
and the apparatus further comprising:
   a look-up table (LUT) generation block for generating for the intra-coded base layer data a first tone mapping table defining a tone mapping between original enhancement layer data and corresponding reconstructed base layer data,
   and for generating for a fraction of the intra-coded base layer data a different second tone mapping table defining a tone mapping between said fraction of the original enhancement layer data and the corresponding fraction of the reconstructed base layer data,
   and for generating a difference table representing the difference between the first tone mapping table and the second tone mapping table;

a bit-depth upsampling block for bit-depth upsampling the reconstructed base layer data based on said first and second tone mapping tables, wherein the second tone mapping table is used only for said fraction of the reconstructed base layer and the first tone mapping table is used for the remainder of the reconstructed base layer, and wherein a predicted version of the corresponding enhancement layer data is obtained that has higher bit-depth resolution than the base layer data;

a difference generator for generating said enhancement layer residual being the difference between the original enhancement layer data and the corresponding predicted version of the enhancement layer data; and a LUT entropy coding unit for encoding the first tone mapping table and said difference table, wherein the encoded first tone mapping table is associated with the encoded base layer or enhancement layer data and the difference table is associated with said fraction of the encoded base layer data or enhancement layer data.

10. An apparatus for decoding video data having a base layer and an enhancement layer, comprising a memory device and a processor configured to:

extract from encoded enhancement layer data or base layer data first and second tone mapping data relating to intra-coded enhancement layer data;

reconstruct in a look-up table (LUT) decoding unit a first tone mapping table from the extracted tone mapping data, reconstruct in the LUT decoding unit a second tone mapping table from the extracted tone mapping data and said reconstructed first tone mapping table, wherein the extracted tone mapping data represent the difference between said first tone mapping table and said second tone mapping table;

determine a first encoding unit to which the first tone mapping table relates, and a second encoding unit to which the second tone mapping table relates, wherein the second encoding unit is a fraction of said first encoding unit;

perform inverse quantization and inverse transformation on received base layer data and enhancement layer data, wherein inverse quantized and inverse transformed enhancement layer data comprise a residual;

reconstruct intra-coded base layer data;

upsample in a bit-depth prediction unit reconstructed base layer data, wherein a value depth per pixel is increased, and wherein for pixels in said second encoding unit the second tone mapping table is used and for remaining pixels of the first encoding unit the first tone mapping table is used, and wherein predicted enhancement layer data are obtained; and reconstruct from the predicted enhancement layer data and the inverse quantized and inverse transformed enhancement layer data reconstructed enhancement layer video data.

11. The apparatus according to claim 10, wherein the first and second tone mapping data are extracted from one or more headers of intra-coded enhancement layer data.

12. The method according to claim 1, wherein separate tone mapping tables are generated for each chrominance channel.

13. The method according to claim 6, wherein separate tone mapping tables are generated for each chrominance channel.

14. The apparatus according to claim 9, wherein separate tone mapping tables are generated for each chrominance channel.

15. The apparatus according to claim 10, wherein separate tone mapping tables are generated for each chrominance channel.

16. A method for encoding a video image having a plurality of slices, each slice having a base layer and an enhancement layer, wherein pixels of the base layer have less color bit depth than pixels of the enhancement layer, the method comprising:

encoding intra-coded base layer data of the video image on a first granularity level;

reconstructing the encoded base layer data;

generating a first tone mapping table defining a tone mapping between original enhancement layer data and corresponding reconstructed base layer data;

generating at least one different second tone mapping table defining a tone mapping between a slice of the original enhancement layer data of the image and the corresponding slice of the reconstructed base layer data;

generating a difference table representing the difference between the first tone mapping table and the second tone mapping table;

bit-depth upsampling the reconstructed base layer data based on said first and second tone mapping tables, wherein the second tone mapping table is used only for said slice of the reconstructed base layer and the first tone mapping table is used for the remaining slice or slices of the reconstructed base layer, and wherein a predicted version of the corresponding enhancement layer data is obtained that has higher bit-depth resolution than the base layer data;

generating an enhancement layer residual being the difference between the original enhancement layer data and the corresponding predicted version of the enhancement layer data; and encoding the enhancement layer residual, the first tone mapping table and said difference table, wherein the encoded first tone mapping table is associated with the encoded base layer or enhancement layer data and the difference table is associated with said slice of the encoded base layer data or enhancement layer data.

17. A method for decoding a video image having a plurality of slices, each slice having a base layer and an enhancement layer, the method comprising:

extracting from encoded enhancement layer data or base layer data first and second tone mapping data relating to intra-coded enhancement layer data;

reconstructing a first tone mapping table from the extracted tone mapping data;

reconstructing a second tone mapping table from the extracted tone mapping data and said reconstructed first tone mapping table, wherein the extracted tone mapping data represent the difference between said first and second tone mapping table;

determining, among the plurality of slices of said video image, at least one first slice to which the first tone mapping table relates, and a second slice to which the second tone mapping table relates;

performing inverse quantization and inverse transformation on received base layer data and enhancement layer data, wherein inverse quantized and inverse transformed enhancement layer data comprise a residual;

reconstructing intra-coded base layer data;

upsampling the reconstructed base layer data, wherein a value depth per pixel is increased, and wherein for pixels in said second slice the second tone mapping table is used and for pixels of the at least one first slice the first tone mapping table is used, and wherein predicted enhancement layer data for each slice are obtained; and reconstructing from the predicted enhancement layer data and the inverse quantized and inverse transformed enhancement layer data reconstructed enhancement layer video data for each slice of the video image.

* * * * *